(12) United States Patent
Pfluger

(10) Patent No.: US 10,378,974 B2
(45) Date of Patent: Aug. 13, 2019

(54) WIM SENSOR WITH SENSOR PACKAGE

(71) Applicant: KISTLER HOLDING AG, Winterthur (CH)

(72) Inventor: Kim Pfluger, Winterthur (CH)

(73) Assignee: Kistler Holding AG, Winterthur (CH)

( * ) Notice: Subject to any disclaimer, the term of this patent is extended or adjusted under 35 U.S.C. 154(b) by 73 days.

(21) Appl. No.: 15/657,604

(22) Filed: Jul. 24, 2017

(65) Prior Publication Data

US 2018/0031429 A1    Feb. 1, 2018

(30) Foreign Application Priority Data

Jul. 26, 2016   (EP) .................................... 16181259

(51) Int. Cl.
*G01L 1/16*     (2006.01)
*G01G 19/02*    (2006.01)
*G08G 1/02*     (2006.01)

(52) U.S. Cl.
CPC .............. *G01L 1/16* (2013.01); *G01G 19/024* (2013.01); *G08G 1/02* (2013.01)

(58) Field of Classification Search
CPC ........... G01G 19/024; G01L 1/16; G08G 1/02
See application file for complete search history.

(56) References Cited

U.S. PATENT DOCUMENTS

| 4,799,381 | A  |   | 1/1989  | Tromp            |           |
|-----------|----|---|---------|------------------|-----------|
| 5,265,481 | A  |   | 11/1993 | Sonderegger et al. |         |
| 5,448,232 | A  |   | 9/1995  | Tyburski         |           |
| 5,461,924 | A  | * | 10/1995 | Calderara        | G01G 3/13 |
|           |    |   |         |                  | 73/768    |
| 5,501,111 | A  |   | 3/1996  | Sonderegger et al. |         |
| 6,301,544 | B1 | * | 10/2001 | Sonderegger      | B60C 23/06 |
|           |    |   |         |                  | 340/933   |
| 9,304,032 | B2 | * | 4/2016  | Cornu            | G01G 3/13 |

(Continued)

FOREIGN PATENT DOCUMENTS

| CN | 104374459 | 2/2015 |
| EP | 0654654   | 5/1995 |

(Continued)

OTHER PUBLICATIONS

European Search Report (EP 16181259.9), dated Feb. 8, 2017.
Japanese Office Action, JP-2017-143370, dated Jun. 26, 2018, 12 pages.

*Primary Examiner* — Francis C Gray
(74) *Attorney, Agent, or Firm* — Dority & Manning, P.A.

(57) ABSTRACT

A WIM sensor for measuring wheel forces of vehicles on a road that pass over the sensor includes an elongated hollow profile along a longitudinal axis thereof. First and second inner pressing surfaces inside the profile are arranged connected in opposition on both sides by curved, pre-tensioned profile edges. Each of a plurality of piezoelectric measuring elements inside the profile has first and second force absorbing surfaces that face the first and said second pressing surface, respectively. Each of the measuring elements is disposed between two absorbing elements that exert a pretension thereon via the pressing surfaces. A long strip of insulating film provided with an electrically conductive layer on one of its sides electrically connects the first force absorbing surfaces of the measuring elements that are electrically insulated from the first pressing surface.

18 Claims, 3 Drawing Sheets

(56) References Cited

U.S. PATENT DOCUMENTS

| | | | |
|---|---|---|---|
| 9,372,110 B2 | 6/2016 | Cornu et al. | |
| 2014/0251700 A1* | 9/2014 | Cornu | G01G 3/13 |
| | | | 177/136 |
| 2014/0345955 A1* | 11/2014 | Cornu | G01G 3/13 |
| | | | 177/180 |
| 2015/0075297 A1* | 3/2015 | Cornu | G01G 3/13 |
| | | | 73/862.642 |
| 2016/0187183 A1* | 6/2016 | Cornu | G01G 19/024 |
| | | | 177/132 |

FOREIGN PATENT DOCUMENTS

| | | | |
|---|---|---|---|
| JP | H02193030 | | 7/1990 |
| JP | H08247875 | | 9/1996 |
| JP | H08247876 | | 9/1996 |
| JP | 2002036929 | | 2/2002 |
| JP | 2005265446 | | 9/2005 |
| JP | 2005265446 A | * | 9/2005 |
| JP | 2015184122 | | 10/2015 |
| WO | WO 2013/104080 | | 7/2013 |

\* cited by examiner

WIM SENSOR WITH SENSOR PACKAGE

CROSS-REFERENCE TO RELATED APPLICATIONS

This application claims priority to EP Application No. 16181259.9, filed Jul. 26, 2016.

FIELD OF THE INVENTION

The invention relates to a WIM sensor for measuring wheel forces of vehicles on a road as they pass over the sensor; said WIM sensor comprising an elongated hollow profile along a longitudinal axis thereof that comprises an interior space having first and second inner pressing surfaces, said pressing surfaces being arranged opposite of each other and connected to one another on both sides by curved, preloaded profile edges; wherein in said interior space are disposed a plurality of piezoelectric measuring elements each having first and second force absorbing surfaces arranged along the longitudinal axes thereof, said force absorbing surfaces facing said first and said second pressing surface, respectively; each of said measuring elements being disposed between two holding elements, wherein said two holding elements exert a pretension onto the measuring elements via said pressing surfaces; and wherein all first force absorbing surfaces of the measuring elements are electrically connected with each other by an electrode and are electrically insulated from the first pressing surface.

BACKGROUND

WIM sensors of this kind are embedded in roads to cross at least one wheel track but preferably to cover the entire lane destined for road vehicles. Also known are longer WIM sensors of up to 4 m in length. The WIM sensors are able to determine the dynamic wheel loads of wheels passing over them to finally derive therefrom the total dynamic load of the vehicle, optionally along with a trailer, that acts onto the WIM sensor or WIM sensors as it passes over the sensor(s).

WIM sensors of various designs based on different measurement principles are available. Of importance for the present invention are WIM sensors of the type as described above.

A first example of a WIM sensor of the aforementioned type is described in U.S. Pat. No. 5,265,481A. Two piezoelectric measuring elements are arranged one above the other in the interior space of the hollow profile. Between them is an electrode that connects all these measuring element pairs and is itself electrically connected to a plug or an output wire at the end of the hollow profile. Support elements are disposed on both sides, i.e., above and below the measuring elements, to ensure that the measuring elements are positioned level between the pressing surfaces within the interior space. The pressing surfaces are connected to one another on both sides via the profile edge and ensure uniform pretensioning of the measuring elements by keeping the profile edge under tension.

For an exact measurement it is important that the amount of pretension is the same over the entire length of the WIM sensor. For this purpose, it is first of all required that the hollow profile is manufactured uniformly over its entire length as regards the wall thickness of the profile edges, distance of the pressing surfaces from each other and evenness of the pressing surfaces. Furthermore, also the entire sensor package that is inserted into the hollow profile must show the same thicknesses over all measuring elements. This is important not only for the measuring elements themselves but in particular for the support elements and the electrode. In U.S. Pat. No. 5,265,481A each measuring element pair has its own pair of support elements. It is relatively difficult to assemble this type of arrangement because all components of the sensor package must be precisely aligned and must be kept from moving with respect to each other until the sensor package has been fully inserted into the clamped hollow profile.

An additional difficulty arises from the use of steel electrodes that have been rolled to comply with the allowed thickness. As a result of rolling the strip temporarily assumes a bent form that winds along the entire length of the strip. Even though the tolerances for thickness and width are fulfilled the lateral offsets may well vary by more than 2 mm per meter. This results in too many rejects since only those sections of the strip can be used that are straight because otherwise lateral short circuits will occur.

A WIM sensor is described in WO2013104080A1 that follows the same measurement principle. The object of this document is to produce the sensor package in a more cost effective way while complying with the required tolerances. This is achieved by long holding elements connected by form-locking connections at their end faces. Thus, on the one hand holding elements can be used that are considerably shorter than the total length of the WIM sensor and on the other hand the entire sensor package is easily integrated in the hollow profile due to the form-locking connections. It is significantly easier to achieve the dimensional accuracy for shorter holding elements than for very long ones. In contrast to the one known from U.S. Pat. No. 5,265,481A that includes pairs of measuring elements, this sensor package has only one measuring element at each measuring point, and thus the electrode connecting all measuring elements is covered with an insulation.

Finally, a WIM sensor of the type describe herein above is known from EP0654654A1. It comprises an insulating plate on which are supported two different types of measuring elements arranged side by side or one above the other. The insulating plate is partially provided with conductor paths.

Advantageously, the insulation and the conductive layer of the electrode are integrated in one component because in this case they are no longer able to move with respect to each other.

BRIEF SUMMARY OF THE INVENTION

It is the object of the present invention to describe a WIM sensor of the aforementioned type having a higher measurement accuracy. Furthermore, the WIM sensor shall be cheaper in production and easier to assemble.

This object has been achieved by the features of the first claim. According to the invention, the electrode has the form of a long strip of insulating film that is provided on one side with an electrically conductive layer; wherein said electrode is arranged in the interior space between the measuring elements and the first pressing surface; and wherein said electrically conductive layer faces the measuring elements.

According to the concept underlying the present invention, the total thickness tolerance of the components is reduced by integrating the insulation together with the electrode into a single member, particularly in the form of an insulating film provided with a conductive layer. Thickness tolerances of plastics generally account for about 10% of the total thickness and therefore this tolerance may be considerably reduced if the insulation is in the form of a film rather than a plate. If in addition, as in the case of the device of the invention, the electrode is applied onto the insulating film in the form of an electrically conductive layer the tolerance may be further reduced because only one member must be installed in contrast to two components, namely an insulation and an electrode. Each of the members exhibits a certain amount of unevenness at two of its sides in the direction of the load path and all those unevennesses taken together reduce the dimensional accuracy of the thickness of the overall assembly so that the required thickness can be better achieved by reducing the number of components.

Therefore, the improvement is achieved on the one hand by reducing the total thickness of the components, in particular the plastic insulation, and on the other hand by reducing the number of components. The electrically conductive layer is material-bonded to the insulating film, it performs the technical function of the electrode. In the following, the terms insulating film and electrode will be used interchangeably because according to the invention the electrode is applied onto the latter in the form of a layer.

Preferably, single crystals, especially made of quartz, are used as the piezoelectric measuring elements for obtaining accurate measuring results.

BRIEF DESCRIPTION OF THE DRAWINGS

In the following the invention will be explained in more detail with respect to the drawings in which

FIG. 6b shows an alternative embodiment of an insulating film according to FIG. 6a;

DESCRIPTION OF EXEMPLARY EMBODIMENTS OF THE INVENTION

Figure 1:
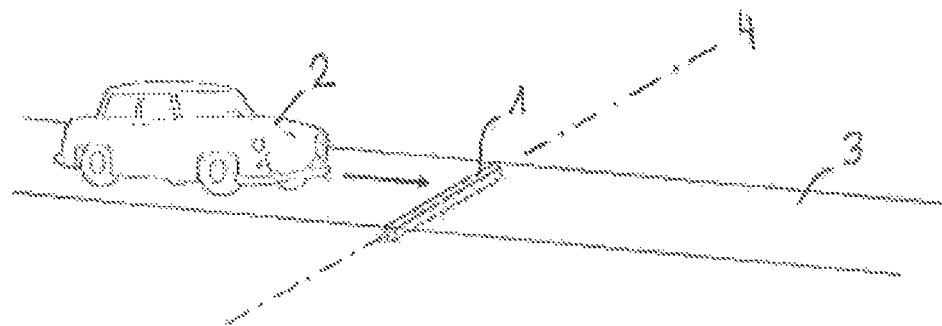
FIG. 1 is a schematic representation of a road in which a WIM sensor is embedded that is passed over by a vehicle.

FIG. 1 shows a road 3 on which a vehicle 2 passes over a WIM sensor 1 in the direction of the arrow; the WIM sensor 1 is embedded in the road 3 and has a longitudinal axis 4. Having a width of about 5 cm, the WIM sensor 1 is narrower than the contact surface of a wheel of the vehicle 2 while its length typically spans the entire lane occupied by the vehicle 2, in this case the entire road 3, as represented in FIG. 1. It measures the dynamic loads acting onto the road 3 while the vehicle 2 passes over the sensor.

Figure 2:
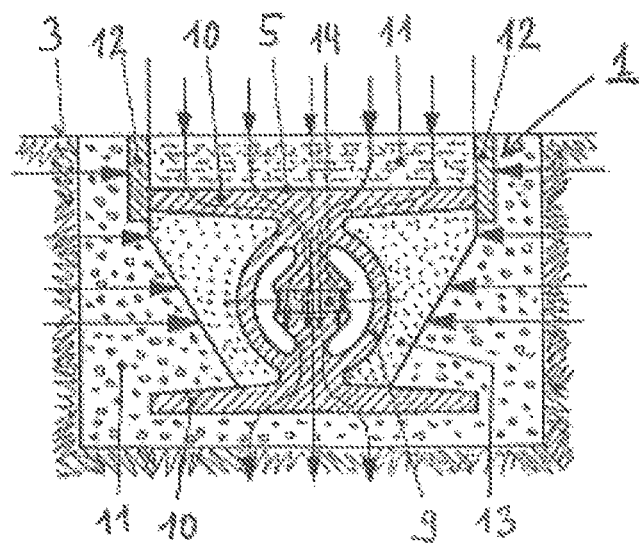
FIG. 2 is a schematic representation of a WIM sensor of the prior art in cross section, embedded in a road.

FIG. 2 shows a schematic representation in cross-section of a WIM sensor 1 according to the prior art embedded in a road 3. It is elongated in shape with its longitudinal axis 4 being perpendicular to the plane of the paper. WIM sensor 1 comprises a hollow profile 5 with an interior space 6 in the middle of which is arranged a sensor package 14. The hollow profile 5 with the sensor package 14 is also depicted and labeled in FIG. 3a. In this embodiment, hollow section 5 includes two force input flanges 10 for bundling the applied wheel forces and guiding them through the sensor package 14. The force input flanges 10 are also referred to as force output flanges 10. On the surface of an upper force input flange 10 there is disposed a mass, usually a potting compound 11, surrounded on both sides by a soft compensating wall 12. A similar potting compound 11 is also used to fill the channel in the road 3 in which the WIM sensor 1 is inserted. In addition, the region directly surrounding the hollow profile 5 is also surrounded by a soft filler material 13 preventing lateral forces from acting on the hollow profile 5.

The vertical arrows describe the force flux from a wheel passing over the WIM sensor 1 on the road 3. The forces are bundled and guided through the sensor package 14 and leave the sensor at the supporting surface of the lower force output flange 10. The arrows on the sides represent lateral forces acting on the WIM sensor 1. They are absorbed by the filler 13 as well as the soft compensating walls 12.

Figure 3A:
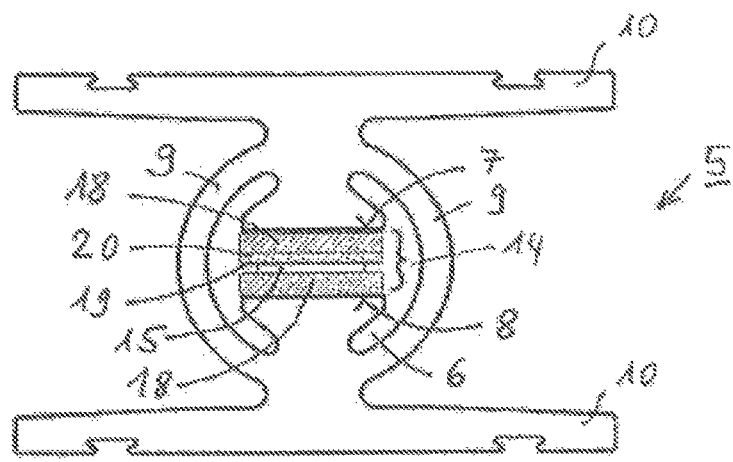
FIG. 3a is a schematic representation of a WIM sensor having a sensor package according to the prior art in cross section.

FIG. 3a shows a schematic representation of a WIM sensor 1 with its sensor package 14 in cross section having the same hollow profile 5. This hollow profile 5 comprises an interior space 6 having a first and a second inner pressing surface 7, 8 arranged opposite of each other. On both sides they are connected by curved, pre-tensioned profile edges 9.

Sensor package 14 is disposed in the interior space 6 between these two pressing surfaces 7, 8. It comprises a plurality of piezoelectric measuring elements 15 arranged along the longitudinal axis. Each of them has first and second force absorbing surfaces 16, 17 facing the first or the second pressing surface 7, 8, respectively, wherein each of the measuring elements 15 is arranged between two holding elements 18 that exert a pretension on the measuring elements 15 via the pressing surfaces 7, 8. On the one hand, all first force absorbing surfaces 16 of the measuring elements are arranged so as to be electrically connected to each other by an electrode 19 and on the other hand electrically insulated from the first pressing surface 7. Single crystals, in particular quartzes, are preferred as the piezoelectric measuring elements 15.

Figure 3B:
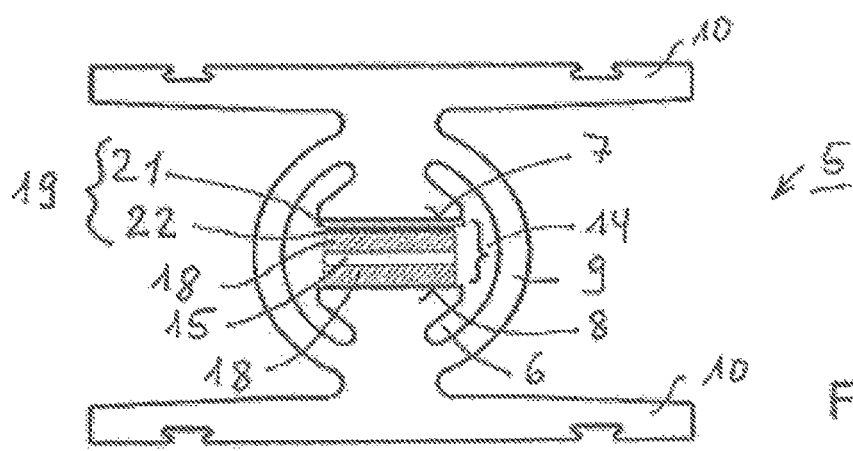
FIG. 3b is a schematic representation of a WIM sensor having a sensor package according to an embodiment of the invention, shown in cross section.

The embodiment according to the invention as depicted in FIGS. 3b and 4 to 7 has a similar basic structure to the embodiments shown in FIGS. 1 to 3. The WIM sensor 1 of the invention preferably has a total length of 0.5 m to 4 m.

FIG. 3a shows an embodiment according to the prior art. It comprises an insulation plate 20 as well as an electrode 19 which according to the prior art are formed as two separate components and are arranged adjacent to measuring elements 15. Also known are certain variations of WIM sensors in which the sensor package is slightly different from the variation shown in FIG. 3a. As an alternative to those shown in the figure that are attached to protrusions, the pressing surfaces 7, 8 in the hollow profile 5 can directly branch off the profile edges 9, as described in U.S. Pat. No. 5,265,481, for example.

Figure 4:
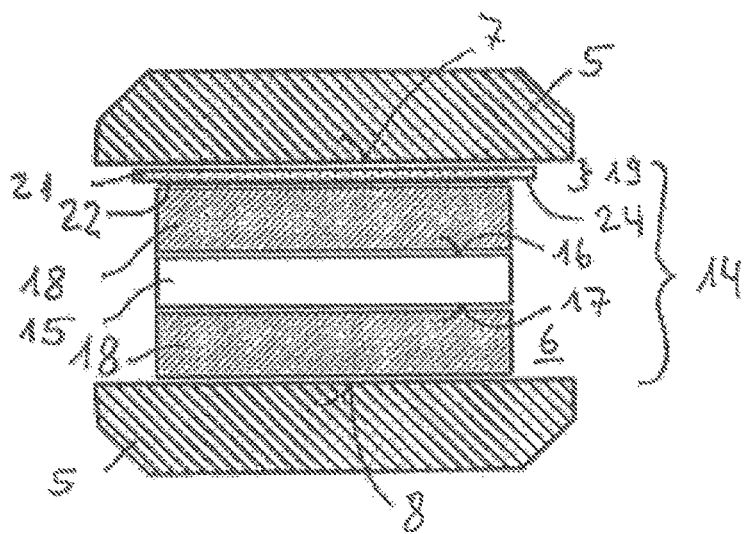
FIG. 4 is a schematic representation of a sensor package according to the invention together with the adjacent pressing surfaces in cross section.

A sensor package 14 according to the invention that is essentially different from the embodiment according to the prior art as shown in FIG. 3a is depicted in FIG. 3b, an enlarged view of which is shown in FIG. 4.

The WIM sensor 1 according to the invention is suitable for measuring wheel forces of vehicles 2 on a road 3 as they pass over the sensor. It comprises a hollow profile 5 formed along a longitudinal axis 4 thereof with an interior space 6 having first and second inner pressing surfaces 7, 8 arranged opposite of each other and connected to one another on both sides by curved, pre-tensioned profile edges 9.

FIG. 4 shows a cross section of a sensor package 14 of the invention inserted in such an interior space 6 in which only the regions of the first and second inner pressing surfaces 7, 8 of the hollow profile 5 are represented.

Figure 5:
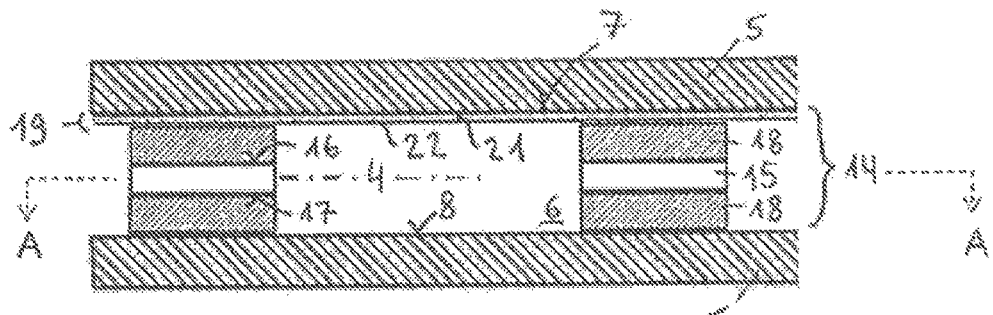
FIG. 5 is a schematic representation of a detail of an edge portion of a WIM sensor of the invention in longitudinal section.

FIG. 5 shows such an interior space 6 between the first and second inner pressing surfaces 7, 8 along the longitudinal axis 4 in the region of the first two measuring elements 15. In the following, the invention will be described referring to FIGS. 3b, 4 and 5.

Arranged within interior space 6 along longitudinal axis 4 are a plurality of piezoelectric measuring elements 15 each having first and second force absorbing surfaces 16, 17 facing the first or the second pressing surface 7, 8, respectively, wherein each of the measuring elements 15 is arranged between two holding elements 18 which exert a pretension on the measuring elements 15 via pressing surfaces 7, 8. All first force absorbing surfaces 16 of the measuring elements 15 are electrically connected to each other by an electrode 19 and are electrically insulated from the first pressing surface 7. The piezoelectric measuring elements 15 are preferably made from a single crystal such as for example quartz.

According to the invention, electrode 19 is formed as a long strip of insulating film 21 provided with an electrically conductive layer 22 on one side and arranged in the interior space 6 between the measuring elements 15 and the first pressing surface 16 so that the electrically conductive layer 22 faces the measuring elements 15. Suitable electrically conductive materials for the electrically conductive layer 22 are in particular chromium and/or copper and/or zirconium and/or gold and alloys containing such metals. Its thickness should range from 0.005 mm to 0.05 mm, preferably from 0.009 mm to 0.036 mm over its entire length with a thickness tolerance of no more than 10% and preferably no more than 0.002 mm.

Figure 6A:
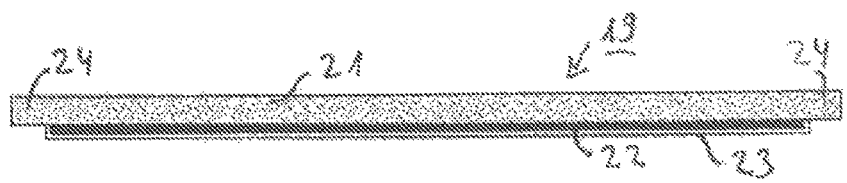
FIG. 6a is a schematic representation of an insulating film according to an embodiment of the invention in cross section.

An electrode of this type is shown in FIG. 6a. The insulating film 21 is preferably a plastic film, in particular a polyimide film, and has a thickness of 0.02 mm to 0.2 mm, preferably of 0.05 mm, wherein the thickness tolerance of the insulating film is no more than 10% and no more than 0.01 mm over its entire length.

Since plastics usually have a high thickness tolerance, especially of 10% or more, it is possible to limit the dimensional accuracy of the sensor package 14 by using an insulating film 21 instead of an insulating plate 20. Moreover, it has been found that the thickness tolerance can be further reduced by integrating the electrically conductive layer 22 and the insulating film 21 into one component 19 that is called electrode 19 herein because of its function.

Several known coating methods are useful for achieving a mechanically stable connection between electrically conductive layer 22 and insulating film 21. Thus, the electrically conductive layer 22 may be laminated onto the insulating film 21. Lamination refers to a thermal joining process creating a firm bond that may be carried out with or without interposing an adhesive. The electrically conductive layer 22 may be firmly joined with the insulating film 21 by using an adhesive material interposed therebetween. However, the electrically conductive layer 22 may also be firmly joined with the insulating film 21 without using an adhesive material therebetween, if for example the insulating film 21 is made of a plastic that will become viscous at elevated temperature and/or pressure and in this viscous state can be firmly bonded to the electrically conductive layer 22 without using an adhesive between them.

Other known coating methods are thermal evaporation or coating by sputtering, or galvanic coating. Thermal evaporation comprises heating of electrically conductive material whereby atoms or molecules are released and condense on the insulating film 21 to form the conductive layer 22. Sputtering is a process of bombarding electrically conductive material with energetic ions by which atoms or molecules are released from the electrically conductive material and deposited on the insulating film 21 to form the conductive layer 22. Galvanic coating comprises applying a firmly adhering electrically conductive layer 22 of amorphous electrically conductive material on the insulating film 21. By thermal evaporation or coating by sputtering or galvanic coating a surface of the insulating film 21 is coated with an electrically conductive material forming the conductive layer 22 with high uniformity and purity. Thus, a further reduction in thickness tolerance can be obtained by using this coating process since this process is able to achieve extremely precise layer thicknesses. In addition, small unevennesses on the surface of the insulating film 21 may also be evened out by the conductive layer 22. Being aware of the present invention those skilled in the art know how to use combinations of the coating processes mentioned above, for example, to use a metallic bonding agent together with lamination or galvanic coating. Such a metallic bonding agent made of chrome or zirconium or another suitable metal is applied to the insulating film 21 prior to the lamination or galvanic coating by thermal evaporation or sputtering after which the actual lamination or galvanic coating process is carried out.

Figure 6B:
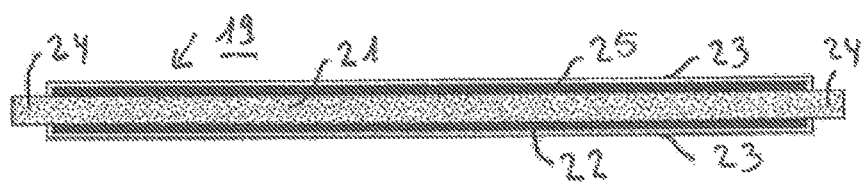

As shown in FIGS. 6a and 6b for example, to prevent corrosion of the electrically conductive layer 22 it may be coated with a corrosion protection 23 which can, for example, include silver. The thickness of the corrosion protection 23 is preferably in the range of 0.0001 mm to 0.0005 mm. Alternatively, the electrically conductive layer 22 may also comprise a precious metal, in particular gold, instead of copper. This will prevent corrosion.

In a presently preferred embodiment of the invention shown in FIGS. 6a and 6b for example, insulating film 21 comprises insulating edge portions 24 on both sides adjacent to the electrically conductive layer 22. This helps to prevent short circuits which may occur if thin insulating films 21 are used and the electrically conductive layer extends up to the edge. Preferably, these electrically insulating edge portions 24 have a width of at least 0.5 mm. Since the electrically conductive layer 22 should be of uniform width and should have at least the same width as that of the adjacent holding element 18 or at least the same width as that of each of the measuring elements 15, it is clear that the insulating film 21 will be wider than the measuring elements 15 and the holding elements 18 abutting on the insulating film 21, as shown in FIG. 4. This ensures a good insulation between the hollow profile 5 and measuring elements 15.

Preferably, insulating film 21 is arranged adjacent to the first pressing surface 7. This has the advantage that the measuring elements 15 along with the holding elements 18 may be assembled into a package on which eventually the coated insulating film 21 is placed. This provides simplified assembly, in particular as regards the centering of the measuring elements 15, by forming the holding elements 18 and the measuring elements 15 in the shape of a pill. Another advantage of this arrangement is that the measuring element 15, in particular the single crystal, will provide better results since it is arranged between metal plates such as holding elements 18 and is not placed next to a plastic component such as insulating film 21 or an insulating plate 20 because plastic is much softer than quartz, for example, or any other piezoelectric single crystal. Thus, vibrating of the measuring element 15 is prevented by providing a hard supporting surface.

To further improve the measurement accuracy, insulating film 21 may be provided with an electrically conductive counter layer 25 opposite the electrically conductive layer 22, as shown in FIG. 6b. This will prevent a capacitance from being generated between conductive layer 22 and first internal pressing flange 16 if the insulating film 21 is spaced apart therefrom in certain regions. Also in this case, the insulating edge portion 24 should be maintained to avoid possible short-circuits.

Figure 7A:
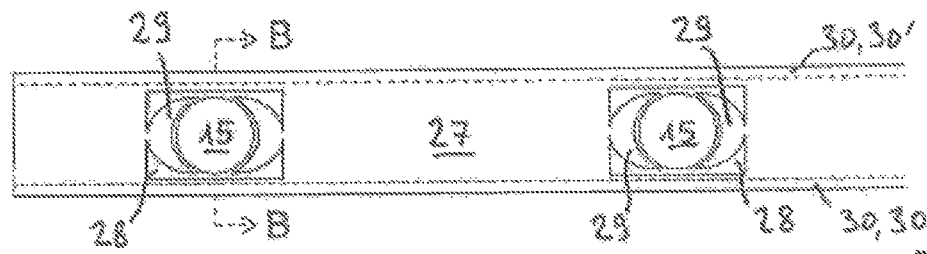
FIG. 7a is a schematic representation along line AA in FIG. 5 of a cage holding the sensor package together.
Figure 7B:
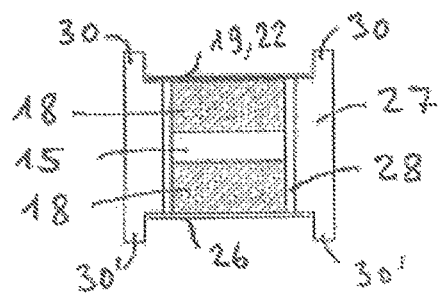
FIG. 7b is a schematic representation of the cage of FIG. 7a cut along line B-B.

Furthermore, in a presently preferred embodiment of the WIM sensor 1 according to the invention shown in FIG. 7b for example, an additional insulating film 26 with an electrically conductive layer 22 is arranged between the measuring elements 15 and the second pressing surface 8, said additional insulating film 26 being arranged facing the measuring elements 15. This can prevent measurement interferences associated with grounding in case of incomplete grounding of the WIM sensor 1, for example. In particular, this additional insulating film 26 may be identical in design to insulating film 21, and they may [[be]] also be arranged symmetrically to each other with regard to the longitudinal axis 4.

In a presently preferred embodiment shown in FIGS. 7a and 7b for example, one or more cages 27 are arranged in the interior space 6 of the WIM sensor 1 according to the invention in which measuring elements 15 and holding elements 18 are fixed to aid with their mounting. As an example, FIGS. 7a and 7b show a top view and another view, respectively, of such a cage 27. Cage 27 comprises recesses 28 with brackets 29 for keeping the measuring elements 15 and holding elements 18 shown in FIG. 5 in place. In addition, cage 27 comprises an insertion rail 30 in which the coated insulating film 21 can be inserted. Another insertion rail 30' disposed opposite of the first one can be used as a mounting aid to guide sensor package 14 over the second inner pressing surface 8. In between, an additional insulating film 26 can be inserted, as also represented in FIGS. 7a and 7b.

The mounting is achieved by pressing the profile edges 9 together whereby the inner pressing surfaces 7, 8 become spaced apart from each other leaving a space in which the sensor package 14 can be inserted. After the pressing force on profile edges 9 is released, the pressing surfaces 7, 8 produce a pretension onto sensor package 14 which exhibits an appropriate total height for that purpose. This total height is greater than the distance between the two inner pressing surfaces 7, 8 from each other in the empty and relaxed state.

According to the invention, the width of the first pressing surface 7 is smaller than the width of the insertion rail 30 and the width of the electrode 19 inserted in this insertion rail 30. In this case, the insulating film 21 can be coated with the electrically conductive layer 22 over its entire surface. In this way, even if along the cutting edge of the insulating film 21 the electrically conductive layer 22 covers also the edge on the back side thereof, a certain spacing of the electrically conductive layer 22 from the first pressing surface 7 will still be ensured. Thus, a short circuit can be prevented. By avoiding the necessity for the insulating edge portion 24 it is possible to fabricate the electrode 19 much more cost-effectively.

The quality of the WIM sensor 1, in particular its measurement accuracy and/or process stability, largely depends on the dimensional accuracy of the required thickness tolerances. As explained herein above, a uniform pretension is achieved that acts equally on all measuring elements.

LIST OF REFERENCE NUMERALS

1 WIM sensor
2 vehicle
3 road
4 longitudinal axis
5 hollow profile
6 interior space
7 first inner pressing surface
8 second inner pressing surface
9 profile edge
10 force input flange or force output flange, respectively
11 potting compound
12 compensation wall
13 filler
14 sensor package
15 piezoelectric measuring element
16 first force absorbing surface
17 second force absorbing surface
18 holding element
19 electrode
20 insulating plate
21 insulating film
22 electrically conductive layer
23 corrosion protection
24 insulating edge portion
25 electrically conductive counter layer
26 additional insulating film
27 cage
28 recess
29 bracket
30, 30' insertion rail

The invention claimed is:

1. A WIM sensor for measuring wheel forces of vehicles that pass over the WIM sensor on a road, the WIM sensor comprising:
  a hollow profile that is elongated along a longitudinal axis thereof, the hollow profile defining an interior space and defining a first inner pressing surface and a second inner pressing surface;
  disposed within the interior space of the hollow profile are the first inner pressing surface and the second inner pressing surface, said inner pressing surfaces being arranged opposite of each other and connected to one another on both sides by curved, pre-tensioned profile edges that are defined by the hollow profile;
  disposed within the interior space of the hollow profile are a plurality of piezoelectric measuring elements, each of the plurality of piezoelectric measuring elements defining a longitudinal axis and having a first force absorbing surface and a second force absorbing surface arranged along the respective longitudinal axis thereof, each said respective first and second force absorbing surface facing the respective first and said second pressing surface, wherein all first force absorbing surfaces of the measuring elements are electrically insulated from the first pressing surface of the hollow profile; and an electrode connecting all first force absorbing surfaces of the measuring elements, the electrode formed as a long strip of insulating film having an electrically conductive layer on one of its sides, the electrode being disposed between the measuring elements and the first pressing surface and with the electrically conductive layer facing the measuring elements.

2. The WIM sensor according to claim 1, wherein the insulating film is a plastic film, preferably a polyimide film; and the insulating film has a thickness of 0.02 mm to 0.2 mm, preferably of 0.05 mm.

3. The WIM sensor according to claim 2, wherein the insulating film has a thickness of 0.05 mm.

4. The WIM sensor according to claim 1, wherein a thickness tolerance of the insulating film over its entire length is no more than 10% and no more than 0.01 mm.

5. The WIM sensor according to claim 1, wherein the electrically conductive layer is adhered on the insulating film by at least one of the following: (1) lamination; (2) thermal evaporation; (3) sputtering; and (4) galvanizing.

6. The WIM sensor according to claim 5, wherein the electrically conductive layer has a thickness in the range of 0.005 mm to 0.05 mm.

7. The WIM sensor according to claim 6, wherein the electrically conductive layer has a thickness in the range of 0.009 mm to 0.036 mm.

8. The WIM sensor according to claim 5, wherein the electrically conductive layer has a thickness tolerance of no more than 10% and no more than 0.002 mm over its entire length.

9. The WIM sensor according to claim 1, wherein the electrically conductive layer is coated with a corrosion protection.

10. The WIM sensor according to claim 9, wherein the corrosion protection has a thickness of 0.0001 mm to 0.0005 mm.

11. The WIM sensor according to claim 1, wherein the insulating film includes on each side thereof an insulating edge portion disposed next to the electrically conductive layer.

12. The WIM sensor of claim 11, wherein each of the electrically insulating edge portions has a width of at least 0.5 mm; and wherein the insulating film is wider than the width of the adjacent holding element.

13. The WIM sensor according to claim 11, wherein the electrically conductive layer has a uniform width that is at least as wide as the width of each of the plurality of measuring elements.

14. The WIM sensor according to claim 1, wherein the insulating film is disposed adjacent to the first pressing surface.

15. A WIM sensor for measuring wheel forces of vehicles that pass over the WIM sensor on a road, the WIM sensor comprising:
a hollow profile that is elongated along a longitudinal axis thereof, the hollow profile defining an interior space;
disposed within the interior space of the hollow profile are a first inner pressing surface and a second inner pressing surface, said inner pressing surfaces being arranged opposite of each other and connected to one another on both sides by curved, pre-tensioned profile edges;
disposed within the interior space of the hollow profile are a plurality of piezoelectric measuring elements, each of the plurality of piezoelectric measuring elements defining a the longitudinal axis and having a first force absorbing surface and a second force absorbing surface arranged along the respective longitudinal axis thereof, each said respective first and second force absorbing surface facing the respective first and said second pressing surface, wherein all first force absorbing surfaces of the measuring elements are electrically insulated from the first pressing surface of the hollow profile;
an electrode connecting all first force absorbing surfaces of the measuring elements, the electrode formed as a long strip of insulating film having an electrically conductive layer on one of its sides, the electrode being disposed between the measuring elements and the first pressing surface and with the electrically conductive layer facing the measuring elements; and
wherein between the first one of the plurality of measuring elements and the second pressing surface is an additional insulating film comprising an electrically conductive layer that faces the first one of the plurality of measuring elements, and wherein the additional insulating film is identical in design to the insulating film.

16. The WIM sensor according to claim 15, wherein the additional insulating film is arranged symmetrically with respect to the insulating film with respect to the longitudinal axis.

17. The WIM sensor according to claim 1, further comprising:
a first holding element and a second holding element disposed within the interior space of the hollow profile, the first and second holding elements being arranged opposite of each other, the first holding element being disposed between the first inner pressing surface of the hollow profile and the first force absorbing surface of a first one of the plurality of piezoelectric measuring elements, the second holding element being disposed between the second inner pressing surface of the hollow profile and the second force absorbing surface of the first one of the plurality of piezoelectric measuring elements, and wherein the first and second holding elements exert a pretension onto the first one of the plurality of piezoelectric measuring elements via the first and second pressing surfaces.

18. The WIM sensor according to claim 17, wherein at least one cage is arranged in the interior space, said cage serving as a mounting aid in which the plurality of measurement elements and the first and second holding elements are fixed, and wherein the cage has at least one insertion rail in which the insulating film is inserted.

* * * * *